United States Patent Office 2,727,124
Patented Dec. 13, 1955

2,727,124
MOLYBDENUM FABRICATION

Roy I. Hardin, Chicago, Ill., assignor to Fansteel Metallurgical Corporation, North Chicago, Ill., a corporation of New York No Drawing. Application December 29, 1950, Serial No. 203,548

5 Claims. (Cl. 219—10)

This invention relates to a method of fabricating molybdenum by an arc welding method to provide crack-free butt welded joints.

Molybdenum, because of its refractory nature, cannot be prepared by common metallurgical smelting practices and is conventionally prepared by powder metallurgy methods and by a vacuum arc casting method. In the conventional powder metallurgy method, powdered molybdenum is pressed in a die and the pressed bar then sintered in hydrogen or in a vacuum. The bar or ingot thus prepared is limited in size. In the vacuum arc casting method, the molybdenum powder is pressed into a bar and the pressed bar employed as an electrode. This pressed bar becomes melted in a vacuum. By this vacuum casting, somewhat larger ingots may be obtained. However, this method also produces ingots or bars of a relatively small size as compared to ingots which may be formed of the more commonly used metals. The bars or ingots produced by powder metallurgy methods and by the vacuum casting method are subsequently mechanically worked as by rolling to produce sheet molybdenum. The size of molybdenum sheet is necessarily limited because of the limited size of the initial bars or ingots.

Because of the refractory nature of the metal, its use for various high temperature applications is highly desirable. The fabrication of various structural shapes has been deterred because of the inability to weld molybdenum to form the desired shape or to form larger sheets of material. Because of the high affinity of molybdenum for oxygen, some of the commonly used welding methods are necessarily excluded. The use of inert atmospheres must be employed to protect molybdenum from oxygen containing atmospheres.

It has been impossible to fabricate molybdenum by the usual arc welding techniques although by inert gas welding techniques the molybdenum may be satisfactorily protected from oxidation. The weld produced is brittle and the weld cracks upon cooling. For example, in the welding of molybdenum sheet, the edges of the molybdenum are placed in abutting relationship and held in such position by mechanical means. The areas immediately overlying the electrode is supplied with the inert gas and an arc initiated between the electrode and the abutting edges. The electrode is then advanced along the abutting edges or the sheet is moved with respect to a fixed electrode. The weld thus produced is always brittle. In most instances the metal which had been melted cracks upon cooling and the crack follows the progress of the arc.

The principal purpose of the present invention is to provide a method of fabricating molybdenum by an arc welding technique.

A further object of this invention is to provide a method of arc welding molybdenum which eliminates the cracking of the welded metal upon cooling.

Other objects and advantages of this invention will become apparent from the description and claims which follow.

As stated hereinbefore, there has been no method known whereby molybdenum sheet can be fabricated by a welding technique. Commercial grade molybdenum sheet generally contains in the neighborhood of 0.005% carbon and in all cases does not contain more than about 0.01% carbon. Attempts to fabricate this type of commercial molybdenum sheet by butt welding results in a cracking of the weld upon cooling and the crack follows the progress of the art.

In my copending application, Serial No. 203,547, filed December 29, 1950, now U. S. Patent 2,698,892, granted January 4, 1955, there is described and claimed a method of fabricating molybdenum by an arc welding method which provides crack-free molybdenum welds by incorporating in the molybdenum certain limited amounts of carbon in the form of combined carbon. Such method requires a modification of the normal production methods employed in producing the molybdenum bars or ingots.

I have discovered that molybdenum may be fabricated with crack-free welds by utilizing a modification of inert gas welding techniques to provide elemental or atomic carbon at the area of the arc or over the area of the molten metal.

The inert gas welding technique is employed in order to protect the molybdenum from oxygen, and such inert gases as argon or helium may be used. I have found that the presence of finely divided carbon such as air spun graphite, lamp black and the like are not satisfactory in preventing the cracking of the weld metal. It is essential that the carbon be in the form of elemental or atomic carbon at the arc or over and adjacent the area of the molybdenum as it is melted. This elemental or atomic carbon is formed by the decomposition of a hydrocarbon material at and in the vicinity of the arc and the molten metal.

The heat decomposable hydrocarbon material may be a gas, liquid or semi-solid material. The gaseous materials, for example, methane, propane and the like, may be conveniently and effectively supplied to the required area by introducing the gaseous material into the stream of inert gas. The liquid hydrocarbon materials, such as higher hydrocarbons, and oils, may be supplied to the required area by spraying or by coating the area of the molybdenum which will be melted. The semi-solid materials, such as hydrocarbon greases, waxes and the like, may be applied by coating the area of the molybdenum which will be melted.

The method of welding conforms to conventional inert gas welding technique with the exception of supplying the heat decomposable hydrocarbon material. The term "heat decomposable hydrocarbon material" is used to designate a hydrocarbon material which undergoes pyrolysis at or in the vicinity of the molten molybdenum and the arc.

The method of this invention is applicable to the production of fabricated molybdenum which is characterized by crack-free butt welds. It is thereby possible to produce sheet molybdenum in large sizes which are not possible because of the limited size of bars or ingots prepared by the conventional production methods. The present method is also applicable to the production of other forms and shapes of fabricated molybdenum such as welded tubing, containers and the like.

I claim:

1. The method of producing fabricated molybdenum characterized by crack-free butt welds which comprises positioning edges of sheet form molybdenum in abutting relationship and arc welding the abutting edges exclusively in an atmosphere of an inert noble gas and in the presence of a heat decomposable hydrocarbon material which decomposes under the heat of the arc to form atomic carbon in the region of the weld.

2. The method of producing fabricated molybdenum characterized by crack-free butt welds which comprises positioning edges of sheet form molybdenum in abutting relationship and arc welding the abutting edges exclusively in an atmosphere of an inert noble gas containing a heat decomposable gaseous hydrocarbon material which decomposes under the heat of the arc to form atomic carbon in the region of the weld.

3. The method as defined in claim 2 wherein the inert gas contains methane.

4. The method as defined in claim 2 wherein the inert gas contains propane.

5. The method of producing fabricated molybdenum characterized by crack-free butt welds which comprises positioning edges of sheet form molybdenum in abutting relationship, applying to the sheet form molybdenum along and adjacent the abutting edges a heat decomposable hydrocarbon material which decomposes under the heat of an arc to form atomic carbon in the region of the weld, and arc welding the abutting edges exclusively in an atmosphere of an inert noble gas and in the presence of the atomic carbon liberated by the decomposition of the hydrocarbon during arc welding.

References Cited in the file of this patent

UNITED STATES PATENTS

| | | |
|---|---|---|
| 1,089,786 | Von Pirani | Mar. 10, 1914 |
| 1,605,071 | Ronci | Nov. 2, 1926 |
| 1,746,210 | Alexander | Feb. 4, 1930 |
| 1,855,898 | Alexander | Apr. 26, 1932 |
| 2,274,631 | Meredith | Feb. 24, 1942 |
| 2,314,628 | Pavlecka | Mar. 23, 1943 |
| 2,497,631 | Rothschild | Feb. 14, 1950 |
| 2,528,758 | King | Nov. 7, 1950 |
| 2,576,793 | Jordan | Nov. 27, 1951 |

OTHER REFERENCES

Miller: Metal Industry, vol. 75, #21, November 18, 1949, pp. 439–441.